United States Patent [19]

Fukawa et al.

[11] Patent Number: 4,757,126
[45] Date of Patent: Jul. 12, 1988

[54] PROCESS FOR PREPARING CRYSTALLINE AROMATIC POLYETHERKETONE

[75] Inventors: Isaburo Fukawa; Tsuneaki Tanabe, both of Fuji, Japan

[73] Assignee: Asahi Kasei Kogyo Kabushiki Kaisha, Osaka, Japan

[21] Appl. No.: 833,076

[22] Filed: Feb. 26, 1986

[30] Foreign Application Priority Data

Feb. 27, 1985 [JP] Japan .................. 60-36288
Jul. 5, 1985 [JP] Japan .................. 60-146650
Jul. 5, 1985 [JP] Japan .................. 60-146651

[51] Int. Cl.$^4$ .................. C08G 8/02; C08G 14/00
[52] U.S. Cl. .................. 528/125; 528/126; 528/128; 528/219
[58] Field of Search .................. 528/125, 126, 128, 219

[56] References Cited

U.S. PATENT DOCUMENTS

| | | | |
|---|---|---|---|
| 3,928,295 | 12/1975 | Rose .................. | 528/125 |
| 4,051,109 | 9/1977 | Barr et al. .................. | 528/125 |
| 4,056,511 | 11/1977 | Staniland .................. | 528/125 |
| 4,105,635 | 8/1978 | Freeman .................. | 528/125 |
| 4,108,837 | 8/1978 | Johnson et al. .................. | 528/126 |
| 4,113,699 | 9/1978 | Rose et al. .................. | 528/125 |
| 4,176,222 | 11/1979 | Cinderey et al. .................. | 528/126 |
| 4,320,224 | 3/1982 | Rose et al. .................. | 528/125 |

FOREIGN PATENT DOCUMENTS

| | | |
|---|---|---|
| 0143407A3 | 11/1984 | European Pat. Off. . |
| 7638225 | 7/1977 | France . |
| 59-164326 | 9/1984 | Japan . |
| 1414421 | 11/1975 | United Kingdom .................. 528/125 |

OTHER PUBLICATIONS

Journal of Polymer Science, vol. 5, 2375–2398(1967), "Poly(aryl Ethers) by Nucleophilic Aromatic Substitution. I. Synthesis and Properties".
Polymer, vol. 22, "Synthesis and Properties of Polyaryletherketones".

*Primary Examiner*—John Kight
*Assistant Examiner*—M. L. Moore
*Attorney, Agent, or Firm*—Birch, Stewart, Kolasch & Birch

[57] ABSTRACT

A process for preparing a crystalline aromatic polyetherketone having a reduced viscosity of 0.6 or more is disclosed. The process includes polycondensing an aromatic dihydroxy compound with a dihalogeno aromatic ketone in a solvent having the following general formula (I) or (II):

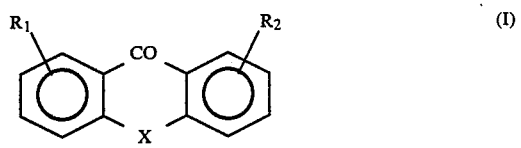

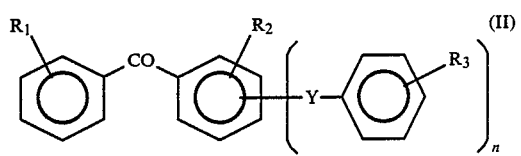

wherein each of $R_1$, $R_2$ and $R_3$ is independently a hydrogen atom, a $C_{1-3}$ alkyl group or a phenyl group; X is an oxygen atom, a sulfur atom or a direct bond; Y is an oxygen atom or a ketone group; and n is 0 or 1;

in the presence of an alkali compound.

16 Claims, No Drawings

PROCESS FOR PREPARING CRYSTALLINE AROMATIC POLYETHERKETONE

BACKGROUND OF THE INVENTION

1. Field of the Invention

This invention relates to an improved process for preparing crystalline aromatic polyetherketones. More particularly, this invention relates to a process for producing crystalline aromatic polyetherketones having a high molecular weight and excellent heat resistance, chemical resistance, mechanical strength and the like, by using a particular solvent.

2. Description of the Prior Art

Crystalline aromatic polyetherketones having a structure comprising phenylene groups bonded via an ether group and a ketone group have been regarded as molding materials since these polymers have excellent heat resistance, chemical resistance and mechanical strength.

For producing the aromatic polyetherketones, a process has been known which comprises reacting a dialkali metal salt of bisphenol having a ketone group with a dihalogeno compound having a ketone group in the presence of an aromatic sulfone at 250°–400° C. (U.S. Pat. No. 4,010,147). Further, a process which comprises heating halophenol having a ketone group with an alkali metal carbonate in N-methylpyrrolidone, aliphatic sulfone or aromatic sulfone at 200°–400° C. (U.S. Pat. No. 4,113,699) has been also known.

In general, in order to produce polymers having a high molecular weight, it is necessary to conduct the reaction in a solvent which can dissolve the produced polymer. In the case of obtaining crystalline aromatic polyetherketones, since the polymer is insoluble in an ordinary solvent at low temperature, the polymerization must be conducted at high temperature. Therefore, it has been said that the selection of a polymerization solvent having good heat stability and a strong polarity sufficient to accelerate the polymerization and to dissolve the resulting polymer is important for the production of crystalline aromatic polyetherketones having a high molecular weight.

As the polymerization solvent, aliphatic sulfone, aromatic sulfone, N-methylpyrrolidone and the like have been employed as described above. However, even these solvents are insufficient for producing highly crystalline aromatic polyetherketones of high molecular weight. For example, when aromatic sulfone is employed as a solvent, unfavorable phenomena such as gelation and coloring often occur because the reaction must be conducted at a high temperature for a long time to obtain high molecular weight polymers having a high crystallinity and high melting point. Further, N-methylpyrrolidone and aliphatic sulfones such as sulfolane are thermally unstable and are inferior to aromatic sulfone as the polymerization solvent.

On the other hand, it had been attempted to obtain a high molecular weight polyetherketone-sulfone copolymer and polysulfone by using benzophenone as the polymerization solvent. But all the experiments were unsuccessful. Therefore, it has been considered that high polar solvents such as sulfone and sulfoxide must be used to produce polymers having a high degree of polymerization. Actually, a high molecular weight polyetherketone-sulfone copolymer having a reduced viscosity of 2.57 can be obtained by reacting 0.075 mole of dipotassium salt of bis-(4-hydroxyphenyl)ketone, 0.045 mole of bis-(4-chlorophenyl)ketone and 0.030 mole of bis-(4-chlorophenyl)sulfone in diphenylsulfone at 290° C. for 17 hours while the copolymer having a reduced viscosity of only 0.14 is produced when benzophenone is used as the solvent instead of diphenylsulfone (U.S. Pat. No. 4,010,147).

Further, it has been reported that high molecular weight poly(aryl ethers) were obtained only in the so-called dipolar aprotic solvents such as dimethylsulfoxide and sulfolane while benzophenone (a reasonably polar solvent) was quite ineffective even at high temperature (J. Polymer Science, Part A-1, Vol. 5, 2379 (1967)).

Thus, there have been no reports that the high molecular weight polyketones were obtained in the aromatic ketones as the polymerization solvents.

SUMMARY OF THE INVENTION

Accordingly, it is an object of the present invention to provide a process for producing a high molecular weight, highly crystalline aromatic polyetherketone by using a specific solvent which is stable at high temperature, excellent in dissolving the produced polymer and can accelerate the polymerization.

Namely, this invention in one embodiment provides a process for preparing a highly crystalline aromatic polyetherketone having a reduced viscosity of 0.6 or more which comprises polycondensing an aromatic dihydroxy compound with a dihalogeno aromatic ketone in a solvent having the following general formula (I) or (II):

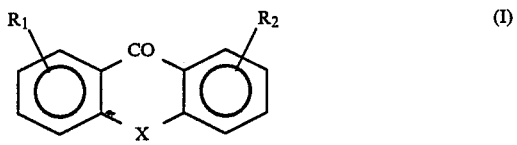

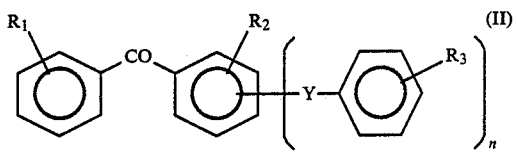

wherein each of $R_1$, $R_2$ and $R_3$ is independently a hydrogen atom, a $C_{1-3}$ alkyl group or a phenyl group; X is an oxygen atom, a sulfur atom or a direct bond; Y is an oxygen atom or a ketone group; and n is 0 or 1;

in the presence of an alkali compound.

In a further embodiment, the present invention provides a process for preparing a crystalline aromatic polyetherketone having a reduced viscosity of 0.6 or more which comprises polycondensing a monohydroxymonohalogeno aromatic ketone or an alkali metal salt thereof in a solvent having the following general formula (I) or (II):

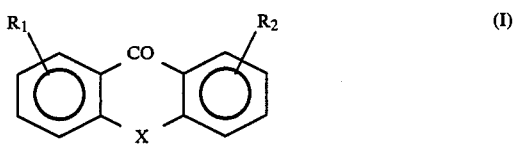

$$\underset{(II)}{\begin{array}{c}R_1\\\diagup\\\text{benzene-CO-benzene}(R_2)-[Y-\text{benzene}(R_3)]_n\end{array}}$$

wherein each of $R_1$, $R_2$ and $R_3$ is independently a hydrogen atom, a $C_{1-3}$ alkyl group or a phenyl group; X is an oxygen atom, a sulfur atom or a direct bond; Y is an oxygen atom or a ketone group; and n is 0 or 1;

DETAILED DESCRIPTION OF THE INVENTION

The polycondensation reaction can be carried out, for example, by heating substantially equimolar amounts of an aromatic dihydroxy compound having a free hydroxyl group with a dihalogeno aromatic ketone in an aromatic ketone solvent in the presence of an alkali compound (reaction (A)); by heating a monohydroxymonohalogeno aromatic ketone having a free hydroxyl group in the solvent in the presence of an alkali compound (reaction (B)), or by heating an alkali metal salt of monohydroxymonohalogeno aromatic ketone in the solvent (reaction (C)).

The aromatic dihydroxy compounds which can be employed in this invention are divalent phenols having the following general formula (III):

$$HO-Ar-OH \qquad (III)$$

wherein Ar is an aromatic residue.

Examples of the aromatic dihydroxy compounds are mononuclear divalent phenols such as hydroxydiphenyl; dihydroxy polyphenyls such as 4,4'-dihydroxydiphenyl; bisphenols such as 2,2-bis(4-hydroxyphenyl)propane, bis(4-hydroxyphenyl)methane, 4,4'-dihydroxybenzophenone, 4,4'-dihydroxydiphenyl ether, 4,4'-dihydroxydiphenyl sulfide, 1,4-bis(4-hydroxybenzoyl)benzene and 1,3-bis(4-hydroxybenzoyl)benzene; and nuclear substituted compounds thereof. These compounds can be used alone or as a mixture thereof. Among them, the preferred ones are hydroquinone and 4,4'-dihydroxybenzophenone.

The dihalogeno aromatic ketones which can be employed in this invention have the following general formula (IV):

$$Z-Ar'-Z \qquad (IV)$$

wherein Ar' is an aromatic residue having at least one benzophenone unit and Z is a halogen atom attached to the position ortho or para to the ketone group.

Among them, the preferred ones are the dihalogeno aromatic ketones having the following general formulae $(IV_1)$, $(IV_2)$ and $(IV_3)$:

$$Z-\text{benzene}-CO-\text{benzene}-Z \qquad (IV_1)$$

$$Z-\text{benzene}-CO-[\text{benzene}]_m-CO-\text{benzene}-Z \qquad (IV_2)$$

$$Z-\text{benzene}-CO-[\text{benzene}]_l-W-[\text{benzene}]_m-CO-\text{benzene}-Z \qquad (IV_3)$$

wherein Z has the same meaning as defined in the formula (IV); W is an ether group, a thioether group, a carbonyl group or a sulfone group; and l and m are an integer of 1 to 3.

Examples of the dihalogeno aromatic ketones are 4,4'-difluorobenzophenone, 2,4'-difluorobenzophenone, 4,4'-dichlorobenzophenone, bis-1,4-(4-fluorobenzoyl)benzene, bis-1,3-(4-chlorobenzoyl)benzene, bis-4,4'-(4-fluorobenzoyl)biphenyl and bis-4,4'-(4-fluorobenzoyl)diphenyl ether. The dihalogeno aromatic ketones can be used alone or as a mixture thereof.

Among the dihalogeno aromatic ketones having the formula (IV), the compounds whose halogen atom is attached to the position para to the ketone group are preferable to obtain the polymers having a high melting point and high crystallinity.

As the halogen atom, a fluorine atom is more preferable than a chlorine atom because the fluorine atom is more active, and by using a fluorine atom, high molecular weight polymers can be obtained easily and the side reactions resulting in coloring and crosslinking of polymers hardly occur.

More preferable dihalogeno aromatic ketones are 4,4'-difluorobenzophenone and bis-1,4-(4-fluorobenzoyl)benzen[4,4''-difluoroterephthalophenone].

The monohydroxymonohalogeno aromatic ketones which can be employed in the present invention are halophenols having the following general formula (V):

$$Z-Ar'-OH \qquad (V)$$

wherein Ar' and Z have the same meaning as defined in the formula (IV).

The alkali salts thereof can also be employed in this invention.

Examples of the halophenols and the alkali salts are 4-fluoro-4'-hydroxybenzophenone, 4-chloro-4'-hydroxybenzophenone, 4-(4-fluorobenzoyl)-4'-hydroxybiphenyl, 4-(4-fluorobenzoyl)-4'-hydroxydiphenyl ether, 4-fluoro-4'-hydroxyterephthalophenone, 4-fluoro-4''-hydroxyisophthalophenone and alkali salts thereof.

The halophenols and alkali salts thereof can be used alone or as a mixture thereof. The alkali salts can be obtained by an ordinary method, for example, by reacting halophenols of the formula (V) with alkali metal hydroxides.

As the halogen atom in the formula (V), a fluorine atom is preferable for the same reason as the case of the dihalogeno aromatic ketones of the formula (IV).

Preferred compounds of the halophenol and the alkali salt are 4-fluoro-4'-hydroxybenzophenone and the alkali salt thereof, respectively.

The solvents used in the polycondensation reaction of this invention are aromatic ketones having the general formula (I) or (II):

$$\underset{(I)}{\begin{array}{c}R_1\qquad\qquad R_2\\\text{benzene-CO-benzene}\\ \diagdown X \diagup\end{array}}$$

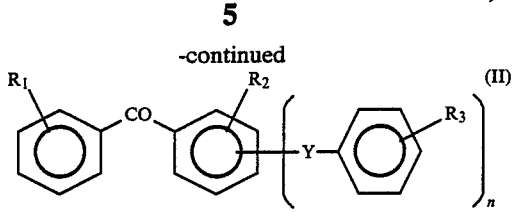

wherein each of $R_1$, $R_2$ and $R_3$ is independently a hydrogen atom, a $C_{1-3}$ alkyl group or a phenyl group; X is an oxygen atom, a sulfur atom or a direct bond; Y is an oxygen atom or a ketone group; and n is 0 or 1.

Examples of such aromatic ketones are benzophenone, xanthone, thioxantone, 1,3-dibenzoylbenzene (isophthalophenone), 1,4-dibenzoylbenzene (terephthalophenone), 4-benzoyldiphenyl ether, fluorenone and nuclear substituted compounds thereof.

Among them, benzophenone (m.p. 48° C.; b.p. 306° C.) is preferable because it is inexpensive, can be treated as a liquid, and so can be recovered and purified easily. Further, since the boiling point is within the range of ordinary polymerization temperatures (280°–340° C.), the control of the polymerization temperature is easier by using the latent heat of evaporation. Moreover, the produced polyetherketones dissolve well in benzophenone and the reactivity of the polymerization reaction is high. Due to these effects, together with the high thermal stability of benzophenone, polyetherketones with high molecular weight, excellent color and high thermal stability are obtained in benzophenone.

Xanthone and thioxantone have an advantage that high molecular weight polymers are produced most easily in these solvents.

Contrary to the conventional solvents such as aromatic sulfones, many of the aromatic ketones used in this invention are readily available because they are industrialized.

The solvents can be used alone or as a mixture thereof. Further, the solvents can be used with other solvents such as diphenylsulfone as long as the purpose of this invention is not ignored.

The reaction of this invention must be carried out in the presence of an alkali compound when reacting the divalent phenol of the formula (III) with the dihalogenoaromatic ketone of the formula (IV) and when reacting the halophenol having a free hydroxyl group of the formula (V).

When the alkali salt of the halophenol is used as the monomer, the addition of alkali compounds is not necessary.

The high molecular weight polymers were not obtained by the reaction of the dialkali salt of the divalent phenol with the dihalogeno aromatic ketone in the absence of an alkali compound.

It is reported that the polyetherketone of the formula

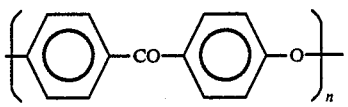

prepared from the potassium salt of 4-fluoro-4'-hydroxybenzophenone in diphenylsulfone contains considerable amounts of gel (Polymer, 1981, Vol. 22, 1096).

On the contrary, gel-free polyetherketones are obtained from the same monomer when the solvents in this invention are used.

As the alkali compound, there can be used hydroxides, carbonates, bicarbonates, fluorides, hydrides, alkoxides and alkylated compounds of alkali metals. Among them, alkali metal carbonates and alkali metal bicarbonates are preferable in view of the polymerization velocity, color and thermostability of the produced polymers and the like. As the alkali metal, potassium, sodium and a mixture thereof are preferable.

When the condensation between divalent phenols of the formula (III) and dihalogeno aromatic ketones (IV) is conducted in this invention, the reaction (A) is carried out by adding the divalent phenol, the dihalogeno aromatic ketone and the alkali compound into the aromatic ketone of the formula (I) or (II) and heating the mixture at 200°–400° C. It is preferable that substantially equimolar amounts of divalent phenol and dihalogeno aromatic ketone are used and the excess should not be over 5 mole % based on the amount of the other. The presence of an excess amount of divalent phenols is not preferable because the thermostability of the produced polymer is liable to be reduced. The use of divalent phenols in an amount of 0.97 to 1.0 mole per 1.0 mole of dihalogeno aromatic ketones is more preferable.

In this reaction (A), a small amount of copolymerization components such as halophenols of the formula (V), 4,4'-dichlorodiphenylsulfone and 4,4'-dihydroxydiphenylsulfone can be used so far as the reaction is not affected by these components and the properties of the produced polymer do no deteriorate.

In the case of using halophenols of the formula (V) or the alkali salts thereof in this invention, the reaction (B) or (C) is carried out by adding the halophenol and the alkali compound or the alkali salt of halophenol to the aromatic ketones of the formula (I) or (II) and heating the reaction mixture. In order to control the molecular weight of the produced polymer and stabilize the end groups of the produced polymer, a little amount of a dihalogeno aromatic ketone or a monohalogeno aromatic ketone can be added to the reaction mixture. The preferable molar ratio of the hydroxyl groups to the halogen atom may range from 1:1 to 1:1.03.

The amount of the alkali compound used in the reactions (A) and (B) is 0.3 to 2 gram atoms in terms of the alkali metal atom per 1 mole of hydroxyl group.

The desired polymers can be obtained by conducting every type of reaction (A), (B) and (C) at 200°–400° C. for 5 minutes to 25 hours. When the reaction temperature is lower than 200° C., the produced polymer precipitates from the reaction mixture, resulting in a low molecular weight product. When the reaction temperature is higher than 400° C., undesirable side reactions such as gelation become remarkable. The preferred temperature ranges from 250° to 340° C.

The amount of the aromatic ketone of the formula (I) or (II) used as the polymerization solvent in this invention is not restricted. It can be within the ordinary range that the polymerization solvent is used in the conventional methods for producing crystalline aromatic polyetherketones. Usually, the weight ratio of the solvent to the total amount of starting materials may range 0.8:1 to 5:1.

According to the processes of the present invention, crystalline aromatic polyetherketones having a high molecular weight and reduced viscosity of 0.6 or more can be produced. In general, production of the crystalline aromatic polyetherketone having a high molecular weight is difficult as compared with other polymers such as polysulfone and polyetherketone-sulfone copolymer because aromatic polyetherketones have a high crystallinity. Therefore it is an unexpected result that highly crystalline aromatic polyetherketones can be obtained when aromatic ketones are used as the polymerization solvent.

Since the methods of this invention use aromatic ketones which are excellent in dissolving the produced polymer as a polymerization solvent, highly crystalline aromatic polyetherketones having a high molecular weight can be easily obtained. Further, since the produced polymer can dissolve into the solvent, stirring the reaction mixture can be smoothly conducted and the production of gel due to local overheating can be suppressed.

As is clear from the chemical structure, the solvents used in this invention have poor oxidizing properties. Therefore, there is no possibility of using oxidizing phenols as a monomer in this invention. Further, the solvents per se are thermally stable and they can be used repeatedly. By using the solvents, polymers having a non-uniform structure such as branching are hardly produced and polymers having excellent heat resistance can be obtained. For example, the sulfuric acid solution of the polyetherketone of the repeating unit

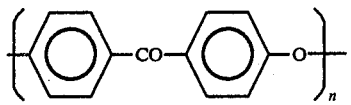

prepared with the solvent in this invention is light yellow and shows no peak or shoulder at 550 nm in its UV spectrum, while that produced in diphenylsulfone is yellow tinged with orange and a peak or a shoulder appears at 550 nm due to the branching structure.

The highly crystalline aromatic polyetherketones having a high molecular weight produced in this invention have excellent heat resistance, chemical resistance, mechanical strength and the like. The polymers can be used as shaped articles, films, fibers, fibrils, coatings as they are, and also used together with other polymers for providing blend materials, or with reinforcements or fillers such as glass fibers, carbon fibers, aramide fibers, calcium carbonate, calcium silicate and the like for providing composite materials.

The following Examples are given to illustrate the present invention more specifically. However, it should be understood that the invention is in no way limited by these Examples.

EXAMPLE 1

In a 100 ml separable flask equipped with a nitrogen gas introducing pipe, a nitrogen gas discharging pipe, a thermometer and a stirrer were placed 10.91 g (0.05 mole) of 4,4'-difluorobenzophenone, 10.71 g (0.05 mole) of 4,4'-dihydroxybenzophenone, 7.19 g (0.052 mole) of anhydrous potassium carbonate and 40 g of benzophenone, and the air in the separable flask was replaced by nitrogen gas. The temperature was raised to 300° C. for one hour under an atmospheric pressure of nitrogen gas while blowing nitrogen gas in several times. The reaction was carried out at 300° C. for 6 hours. Subsequently, 4 g of dichlorodiphenylsulfone was added to stabilize the polymer chain terminals. The reaction product was cooled, pulverized in water, washed with warm acetone twice, warm water twice and warm acetone once to give 18.9 g of a white polymer powder in 96% yield.

The $^1$H-NMR spectrum of the polymer measured in 2 wt/vol % sulfuric acid-$d_2$ revealed two doublet peaks at 7.65 ppm and 6.95 ppm, which showed two kinds of hydrogen atoms in the polymer, and the $^{13}$C-NMR spectrum of the polymer measured in 10 wt/vol % sulfuric acid-$d_2$ revealed five peaks at 200.8 ppm, 164.7 ppm, 138.4 ppm, 124.9 ppm and 120.1 ppm, which showed five kinds of carbon atoms. No other peaks were observed in both $^1$H-NMR and $^{13}$C-NMR specra.

This polymer was confirmed to have a structure of repeating units:

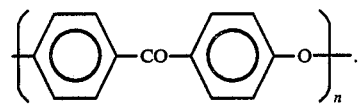

The polymer was completely dissolved in concentrated sulfuric acid. The reduced viscosity ($\eta_{sp/c}$) of the polymer measured in concentrated sulfuric acid having a specific gravity of 1.84 was 0.81 dl/g at 25° C. The melting point of the polymer measured by using a differential scanning calorimeter (DSC) with a temperature rise rate of 10° C./min was 367° C.

The polymer was pressed at 400° C. and cooled immediately to give a light yellowish transparent film having excellent strength.

REFERENCE EXAMPLE 1

Synthesis of 4-fluoro-4'-hydroxybenzophenone potassium salt

In 160 ml of 1N potassium hydroxide aqueous solution (f=1.0046) was dissolved 34.75 g (0.161 mole) of 4-fluoro-4'-hydroxybenzophenone which was recrystallized from isopropanol to give a yellow solution. The solution was dehydrated by using a rotary evaporator to result in a viscous solution. Subsequently, the solution was dried under vacuum at 90° C. for 10 hours to give 42.2 g of a yellow solid. The solid was pulverized in a nitrogen gas box and further dried under vacuum at 90° C. for 10 hours to give 42.1 g of a product. The water content of the obtained 4-fluoro-4'-hydroxybenzophenone potassium salt was calculated to 2.9% because the calculated yield of dehydrated pure product was 40.9 g.

The purity and the water content of the obtained 4-fluoro-4'-hydroxybenzophenone potassium salt which were measured by dissolving the salt in water and titrating the solution with 0.2N sulfuric acid by using Methyl Red as an indicator were 97.4% and 2.6%, respectively.

REFERENCE EXAMPLE 2

Synthesis of 4,4'-dihydroxybenzophenone dipotassium salt

In 300 ml of 1N potassium hydroxide aqueous solution (f=1.0046) was dissolved 32.28 g (0.151 mole) of 4,4'-dihydroxybenzophenone to give a yellowish brown solution. The same dehydrating and drying procedures as employed in Reference Example 1 were repeated to give 46.5 g of a yellowish brown solid. The water content of the obtained 4,4'-dihydroxybenzophenone dipotassium salt was the calculated to 5.9% because calculated yield of dehydrated pure product was 43.8 g. The water content measured by titration with sulfuric acid was 6.3%.

EXAMPLES 2–16

The same procedures as employed in Example 1 were repeated except that the reaction conditions shown in Table 1 were employed. The results were also shown in Table 1.

All the polymers obtained in these Examples entirely dissolved in concentrated sulfuric acid and the solutions contained no gel. Each polymer was pressed at 400° C. and cooled immediately to give a light yellowish transparent tough film. The films obtained by pressing the polymers at 400° C. for 30 minutes and then quenching also dissolved in concentrated sulfuric acid, and the reduced viscosities of films showed up to a 5% increase as compared with those of the original polymer.

TABLE 1

| Example No. | Monomer | (mole) | Solvent | Catalyst (g) | (mole) | Temp. (°C.) | Time (hr.) | Polymer Structure | Reduced Viscosity (dl/g) | Melting Point (°C.) | Color of Conc. H₂SO₄ Solution |
|---|---|---|---|---|---|---|---|---|---|---|---|
| 1 | 4,4'-difluorobenzophenone<br>4,4'-dihydroxybenzophenone | 0.05<br>0.05 | benzophenone | 40 potassium carbonate | 0.052 | 300 | 6 | | 0.81 | 367 | yellow |
| 2 | 4-fluoro-4'-hydroxybenzophenone | 0.10 | benzophenone | 40 potassium carbonate | 0.052 | 300 | 6 | | 1.57 | 367 | yellow |
| 3 | 4,4'-difluorobenzophenone<br>hydroquinone | 0.05<br>0.05 | benzophenone | 40 potassium carbonate | 0.052 | 300 | 6 | | 1.28 | 340 | yellow |
| 4 | 1,4-bis(4-fluorobenzoyl)-benzene<br>hydroquinone | 0.05<br>0.05 | benzophenone | 40 potassium carbonate | 0.052 | 300 | 6 | | 0.83 | 366 | orange |
| 5 | 4,4'-difluorobenzophenone<br>4,4'-dihydroxybenzophenone | 0.05<br>0.05 | xanthone | 40 potassium carbonate | 0.052 | 300 | 3 | | 1.30 | 367 | yellow |
| 6 | 4-chloro-4'-hydroxybenzophenone | 0.10 | xanthone | 40 potassium carbonate | 0.052 | 300 | 6 | | 0.71 | 365 | yellow tinged with orange |
| 7 | 4-fluoro-4'-hydroxybenzophenone | 0.10 | xanthone | 40 potassium carbonate | 0.052 | 300 | 3 | | 1.80 | 367 | yellow |
| 8 | 4-fluoro-4'-hydroxybenzophenone | 0.10 | thioxanthone | 40 potassium carbonate | 0.052 | 300 | 3 | | 1.22 | 366 | yellow |
| 9 | 1,4-bis(4-fluorobenzoyl)-benzene<br>hydroquinone | 0.05<br>0.05 | xanthone | 40 potassium carbonate | 0.052 | 300 | 3 | | 0.81 | 366 | orange |
| 10 | 1,4-bis(4-chlorobenzoyl)-benzene<br>hydroquinone | 0.05<br>0.05 | xanthone | 40 potassium carbonate | 0.052 | 300 | 6 | | 0.62 | 364 | orange |

TABLE 1-continued

| Example No. | Monomer | (mole) | Reaction Conditions Solvent | (g) | Catalyst | (mole) | Temp. (°C.) | Time (hr.) | Product Polymer Structure | Reduced Viscosity (dl/g) | Melting Point (°C.) | Color of Conc. H$_2$SO$_4$ Solution |
|---|---|---|---|---|---|---|---|---|---|---|---|---|
| 11 | 4-fluoro-4'-hydroxy-benzophenone | 0.10 | isophthalo-phenone | 40 | potassium carbonate | 0.052 | 300 | 3 | ‒(‒⌬‒CO‒⌬‒O‒)$_n$‒ | 0.79 | 367 | yellow |
| 12 | 4-fluoro-4'-hydroxy-benzophenone | 0.10 | 4-benzoyl-diphenyl ether | 40 | potassium carbonate | 0.052 | 300 | 8 | ‒(‒⌬‒CO‒⌬‒O‒)$_n$‒ | 0.63 | 366 | yellow |
| 13 | 1,4-bis(4-fluorobenzoyl)-benzene<br>4,4'-dihydroxybenzophenone | 0.05<br>0.05 | benzophenone | 40 | potassium carbonate | 0.052 | 300 | 8 | ‒(‒⌬‒CO‒⌬‒CO‒⌬‒O‒⌬‒O‒)$_n$‒ | 0.80 | 370 | orange |
| 14 | 4-fluoro-4'-hydroxy-benzophenone | 0.10 | fluorenone | 40 | potassium carbonate | 0.052 | 300 | 6 | ‒(‒⌬‒CO‒⌬‒O‒)$_n$‒ | 0.82 | 367 | yellow |
| 15 | 4-fluoro-4'-hydroxy-benzophenone potassium salt | 0.10 | benzophenone | 40 | — | — | 300 | 1 | ‒(‒⌬‒CO‒⌬‒O‒)$_n$‒ | 1.55 | 367 | yellow |
| 16 | 4-fluoro-4'-hydroxy-benzophenone potassium salt | 0.10 | benzophenone | 40 | — | — | 300 | 3.5 | ‒(‒⌬‒CO‒⌬‒O‒)$_n$‒ | 2.26 | 367 | yellow |

EXAMPLE 17

In a 1 l autoclave made of stainless steel were placed 162 g (0.75 mole) of 4-fluoro-4'-hydroxybenzophenone, 1.64 g (0.0075 mole) of 4,4'-difluorobenzophenone, 51.83 g (0.375 mole) of potassium carbonate and 300 g of benzophenone, and the air in the autoclave was replaced by nitrogen gas. When the temperature was raised to 250° C. for 50 minutes with stirring, nitrogen gas was blown into the autoclave at 0.5 l/min. One hour later from the beginning of the blowing of the nitrogen gas, the temperature was raised to 300° C. The reaction was carried out for 3 hours. The reaction product was treated by the same procedures as employed in Example 1 to give 139 g of a white polymer powder. The polymer was completely dissolved in concentrated sulfuric acid to give a yellow solution. No absorption based on the branching structure was observed at 550 nm in UV spectrum. The reduced viscosity of the polymer measured at 25° C. was 1.03, and the reduced viscosity of the film obtained by pressing the polymer at 400° C. for 30 minutes was 1.06. The melt index (MI) of the polymer measured at 400° C. was 10 g/10 min (load 2.16 kg; orifice diameter 2.09 mm). The same polymer was passed the melt indexer at 400° C. four times to clarify the melt stability of the polymer. The M1 values at the first to fourth pass were the completely same.

Comparative Examples 1-6

The polymerizations were conducted in the same manner as Examples 2, 6, 9, 13, 15, and 16 except that diphenylsulfone was used as the solvent. The properties of the resulting polymers 2°, 6', 9', 13', 15', and 16' are shown in table 2 together with the data obtained by using the solvents in the present invention.

As shown in table 2, the polymers prepared in the solvent in this invention have a higher molecular weight and show higher thermal stability than those prepared in diphenylsulfone.

TABLE 2

| Comparative Example No. | Polymer No. | Solvent | Reduced Viscosity (dl/g) Original Polymer | Reduced Viscosity (dl/g) Pressed Film*1 | Absorbance at 550 nm*2 |
|---|---|---|---|---|---|
| 1 | 2*4 | benzophenone | 1.57 | 1.60 | 0.01 |
|   | 2' | diphenylsulfone | 0.63 | 1.03*3 | 0.08 |
| 2 | 6*4 | xanthone | 0.71 | 0.75 | 0.06 |
|   | 6' | diphenylsulfone | 0.35 | — | 0.24 |
| 3 | 9*4 | xanthone | 0.81 | 0.85 | — |
|   | 9' | diphenylsulfone | 0.56 | 0.63 | — |
| 4 | 13*4 | benzophenone | 0.80 | 0.83 | — |
|   | 13' | diphenylsulfone | 0.26*3 | — | — |
| 5 | 15*4 | benzophenone | 1.55 | 1.63 | 0.01 |
|   | 15' | diphenylsulfone | 0.50*3 | 0.84*3 | 0.06 |
| 6 | 16*4 | benzophenone | 2.26 | 2.35 | 0.02 |
|   | 16' | diphenylsulfone | 0.85*3 | 2.15*3 | 0.08 |

*1 pressed for 30 minutes at 400° C.
*2 measured on 0.1 wt % solution of the original polymer in concentrated sulfric acid
*3 contains gel
*4 polymers obtained by Examples 2, 6, 9, 13, 15 and 16, respectively The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for preparing a crystalline aromatic polyetherketone having a reduced viscosity of 0.6 or more which comprises polycondensing 4,4'-dihydroxybenzophenone or hydroquinone with a dihalogeno aromatic ketone in a solvent having the following general formula (I) or (II):

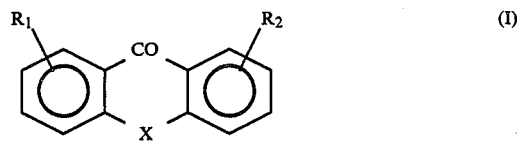

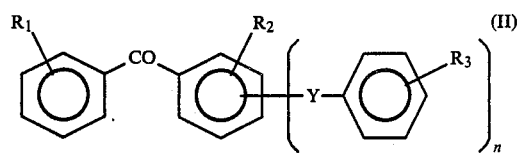

wherein each of $R_1$, $R_2$ and $R_3$ is independently a hydrogen atom, a $C_{1-3}$ alkyl group or a phenyl group; X is an oxygen atom, a sulfur atom or a direct bond; Y is an oxygen atom or a ketone group; and n is 0 or 1;
in the presence of an alkali compound.

2. The process according to claim 1, wherein the solvent has the general formula (I) and X is an oxygen atom or a sulfur atom.

3. The process according to claim 1, wherein the solvent has the general formula (II) and n is 0.

4. The process according to claim 1, wherein the alkali compound is an alkali metal carbonate or an alkali metal bicarbonate.

5. The process according to claim 3, wherein the dihalogeno aromatic ketone is a difluoro aromatic ketone.

6. The process according to claim 1, wherein the solvent has the general formula (II), n is 1, and Y is a ketone group.

7. A process for preparing a crystalline aromatic polyetherketone having a reduced viscosity of 0.6 or more which comprises polycondensing a monohydroxymonohalogeno aromatic ketone in a solvent having the following general formula (I) or (II):

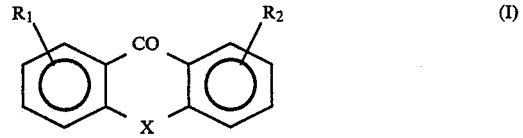

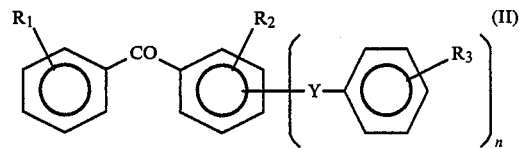

wherein each of $R_1$, $R_2$ and $R_3$ is independently a hydrogen atom, a $C_{1-3}$ alkyl group or a phenyl group, X is an oxygen atom, a sulfur atom or a direct bond; Y is an oxygen atom or a ketone group; and n is 0 or 1 in the presence of an alkali compound.

8. The process according to claim 7, wherein the solvent has the general formula (I) and X is an oxygen atom or a sulfur atom.

9. The process according to claim 7, wherein the solvent has the general formula (II) and n is 0.

10. The process according to claim 7, wherein the alkali compound is an alkali metal carbonate or an alkali metal bicarbonate.

11. The process according to claim 7, wherein the monohydroxymonohalogeno aromatic ketone is a monohydroxymonofluoro aromatic ketone.

12. The process according to claim 7, wherein the solvent has the general formula (II), n is 1, and Y is a ketone group.

13. The process according to claim 3, wherein the solvent is benzophenone.

14. The process according to claim 9, wherein the solvent is benzophenone.

15. The process according to claim 5, wherein the dihalogeno aromatic ketone is a member selected from the group consisting of 4,4'-difluorobenzophenone and bis-1,4-(4-fluorobenzoyl)benzen.

16. The process according to claim 11, wherein the monohydroxymonofluoro aromatic ketone is 4-fluoro-4'-hydroxybenzophenone.

* * * * *